US007017328B2

(12) United States Patent
Komiya et al.

(10) Patent No.: US 7,017,328 B2
(45) Date of Patent: Mar. 28, 2006

(54) CABLE PROTECTION AND GUIDE DEVICE

(75) Inventors: Shoichiro Komiya, Osaka (JP); Takayuki Matsuda, Osaka (JP); Masaaki Ikeda, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 0 days.

(21) Appl. No.: 10/940,108

(22) Filed: Sep. 14, 2004

(65) Prior Publication Data

US 2005/0102993 A1 May 19, 2005

(30) Foreign Application Priority Data

Nov. 13, 2003 (JP) ............................ 2003-384151

(51) Int. Cl.
*F16G 13/16* (2006.01)

(52) U.S. Cl. ........................... 59/78.1; 59/900; 248/49

(58) Field of Classification Search ................. 59/78.1, 59/900; 248/49, 51
See application file for complete search history.

(56) References Cited

U.S. PATENT DOCUMENTS 3,664,619 A * 5/1972 Heidrich et al. ............. 59/78.1
3,779,003 A * 12/1973 Boissevain et al. .......... 59/78.1
5,638,672 A * 6/1997 Furukawa .................. 59/78.1
5,809,767 A * 9/1998 Tanaka ............................ 59/5
6,067,788 A * 5/2000 Weber ........................... 59/78.1
6,094,902 A * 8/2000 Drews et al. ................ 59/78.1
6,855,080 B1 * 2/2005 Kanehira et al. ........... 474/231

FOREIGN PATENT DOCUMENTS

JP 3115995 9/2000

* cited by examiner

*Primary Examiner*—David B. Jones
(74) *Attorney, Agent, or Firm*—Woodling, Krost and Rust

(57) ABSTRACT

To provide a cable protection and guide device, which suppresses wear powders and can be used without being contaminated even in a clean room or reduced-pressure environment, and in which even if link frame bodies are twisted each other, the mutual connection of the link frame bodies is not disconnected and connection and incorporation of the link frame bodies can be simply, reliably performed. In a cable protection and guide device in which a large number of rectangular link frame bodies 10 each comprising a pair of spaced link plates 11, 11, and connecting plates 12, 13 bridged over a bending inner circumferential side and a bending outer circumferential side of the pair of link plates 11, 11 respectively are articulately connected to each other by connecting pins 11*c* and connecting pin holes 11*d* formed in the link plates 11, the link frame bodies 10 are composed of a fluorine resin molded product and even if the link frame bodies 10 are twisted each other, the connecting pin 11*c* has pin length enough to maintain the fit into the connecting pin hole 11*d*.

2 Claims, 2 Drawing Sheets

CABLE PROTECTION AND GUIDE DEVICE

This patent application claims the priority of Japanese Patent Application 2003-384151 filed Nov. 13, 2003.

TECHNICAL FIELD

The present invention relates to a cable protection and guide device, for securely reliably protecting and guiding a flexible cable or the like, such as an electrical cable, a hydraulic hose, a pneumatic hose, an optical fiber cable or the like, used in industry machines such as a machine tool, an electric device, an industrial robot, a transportation machine or the like, and which electricity feeding, fluid feeding and signaling and the like are performed to the moving machines or movable portions of the machines.

BACKGROUND TECHNOLOGY

Such kinds of cable protection and guide devices usually include a large number of link members each comprising a pair of spaced upright pieces, a bottom plate connected to a bending inner circumferential side of the upright pieces and a flap bridged over a bending outer circumferential side of the upright pieces in an openable manner. These link members are articulately connected to each other by shafts and shaft holes formed in the upright pieces (see for example Patent Reference 1).

This cable protection and guide device is used when a movable portion and a stationary portion in an industrial machine are connected to each other. And one end of a number of connected link members is connected to a stationary portion through a fixed end jig and the other end thereof is connected to a movable portion through a movable end jig. An electrical cable, which connects the stationary portion and the movable portion, is inserted into the inner space formed continuously formed link members. On end of the electrical cable is electrically connected to a driving source such as an electric motor, and the other end thereof is electrically connected to an electricity feeding device.

Further, the link member is composed of a polyamide resin molded product such as a glass fiber reinforced Nylon as in the fixed end jig and the movable end jig.

Patent Reference 1: Specification of Japanese Patent No. 3,115,995 (on page 1, FIG. 3).

PROBLEMS TO BE SOLVED BY THE INVENTION

However, the glass fiber reinforced polyamide resin used in the conventional cable protection and guide device contains reinforcing fillers such as a heat stabilizer, an anti-oxidizing agent, a reinforcement material and a lubricant for mold releasing. Thus in the conventional cable protection and guide device, not only fine particles due to outgassing from these reinforcing fillers are generated but also a cable is damaged by glass fiber to produce wear powder. Accordingly, there was a problem that the conventional cable protection and guide device is difficult to be adopted in a clean environment or a reduced-pressure environment.

Further, a glass fiber reinforced polyamide resin becomes a rigid molded product that cannot exhibit flexibility. Thus, when the link members are connected to each other to be incorporated, the fit between a shaft and a shaft hole is impossible. Accordingly, to facilitate incorporation the shaft length must be minimized. Thus when the link members receive twist there was a problem in handling that connected mutual link members are easy to be disengaged.

Accordingly, the objects of the present invention are to solve the above-mentioned problems and to provide a cable protection and guide device, which suppresses wear powders and can be used without being contaminated even in a clean room or reduced-pressure environment, and in which even if link frame bodies (members) are twisted each other, the mutual connection of the link frame bodies is not disconnected and connection and incorporation of the link frame bodies can be simply, reliably performed.

MEANS FOR SOLVING THE PROBLEMS

To attain the above-mentioned objects according to the invention of claim 1, a cable protection and guide device, in which a large number of rectangular link frame bodies each comprising a pair of spaced link plates, and connecting plates bridged over a bending inner circumferential side and a bending outer circumferential side of the pair of link plates respectively are articulately connected to each other by connecting pins and connecting pin holes formed in said link plates and a cable is inserted into a cable accommodating space formed of the continuously formed link frame bodies to guide and protect said cable, is characterized in that said link frame bodies are composed of a fluorine resin molded product and even if said link frame bodies are twisted each other, said connecting pin has pin length enough to maintain the fit into the connecting pin hole.

The cable protection and guide device of claim 2 further attains the above-mentioned objects by, in addition to the configuration of claim 1, that said connecting pin has a tapered incorporating guide surface for projecting the head of the connecting pin from a fitted connecting pin hole to the outside surface of the link plate.

If the link frame body used in the cable protection and guide device of the present invention is composed of a fluorine resin molded product, which can suppress wear powders generated by friction with a cable or the like, any fluorine resin molded product may be used. Particularly, if the molded product is a polyvinylidene fluoride resin molded product, a further excellent injection molding workability can be exerted.

EFFECTS OF THE INVENTION

Thus, according to the cable protection and guide device of the present invention, the following peculiar effects can be exerted by the above-mentioned configurations.

Namely, in the cable protection and guide device, which is the invention of claim 1, since a link frame body is composed of a fluorine resin molded product, the generation of outgassing due to conventional reinforced fillers is small, and wear powders generated by friction with a cable or the like can be suppressed. And since the link frame body can exert chemically stabilized chemical resistance and excellent electrical insulation properties in long-term exposure conditions, the cable protection and guide device of the present invention can be used without contaminating inner environment even in a clean room and a reduced-pressure room in a semiconductor production a food production processing and the like, and can stably, reliably protect and guide a flexible cable or the like, such as an electrical cable, a hydraulic hose, a pneumatic hose, an optical fiber cable or the like, which performs electricity feeding, fluid feeding and signaling and the like between stationary portions and a movable portions in various industrial machines.

Further, even if link frame bodies are twisted each other, the connecting pin has pin length enough to maintain the fit into the connecting pin hole. Accordingly, the fit state between the connecting pins and the connecting pin holes in the link frame body is sufficiently maintained and is not disconnected even if the link frame bodies receives some form deformations, whereby excellent reliable cable protection and guide device can be obtained.

In the cable protection and guide device, which is the invention of claim 2, since the connecting pin has a tapered incorporating guide surface for projecting the head of the connecting pin from a fitted connecting pin hole to the outside surface of the link plate. Thus, in addition to the effects exerted by the invention of claim 1, in a connection incorporating operation for connecting the link bodies to each other, since a connecting pin hole in a link frame body to be connected can be fitted to the pin of the adjacent link frame body along a tapered incorporating guide surface formed in the link frame body while utilizing a slide action due to a low friction coefficient, which is peculiar to a fluorine resin, the connection incorporating of the link frame bodies can be simply, reliably performed.

Figure 1:
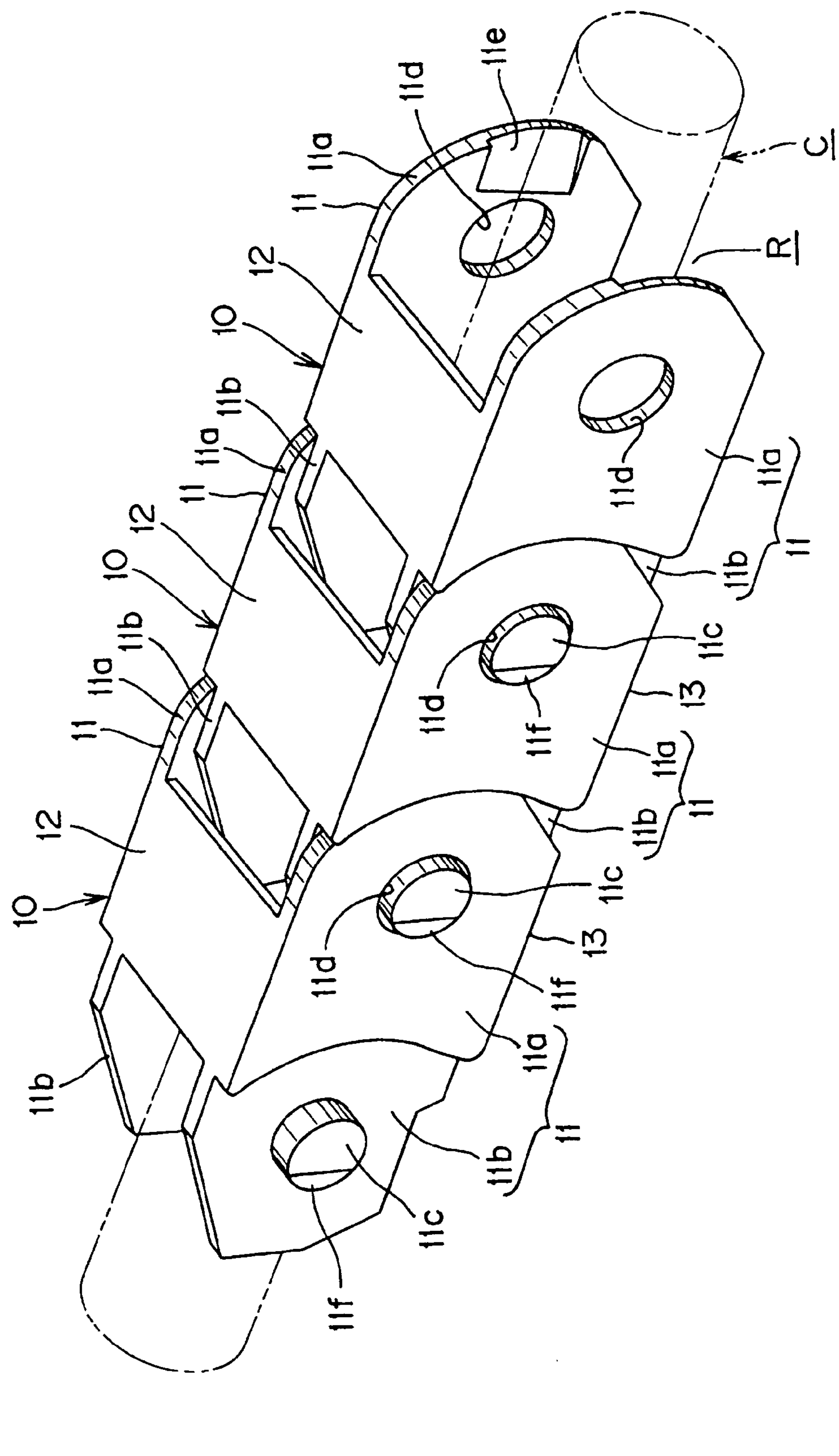
FIG. 1 is a perspective view of a cable protection and guide device, which is one example of the present invention.

A better understanding of the drawing Figures will be had when reference is made to the following Description Of The Invention and Claims which follow hereinbelow.

DESCRIPTION OF THE INVENTION

Figure 2:
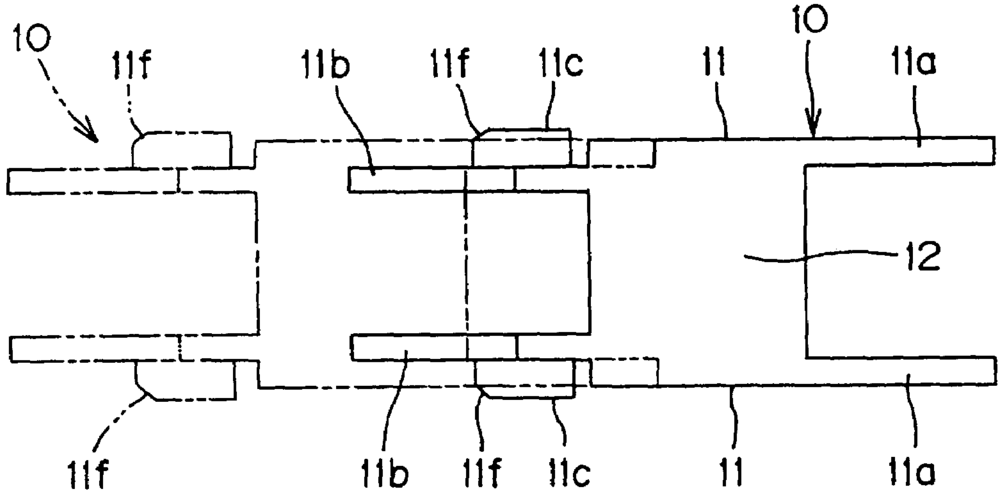
FIG. 2 is plan view of a link frame body shown in FIG. 1.
Figure 3:
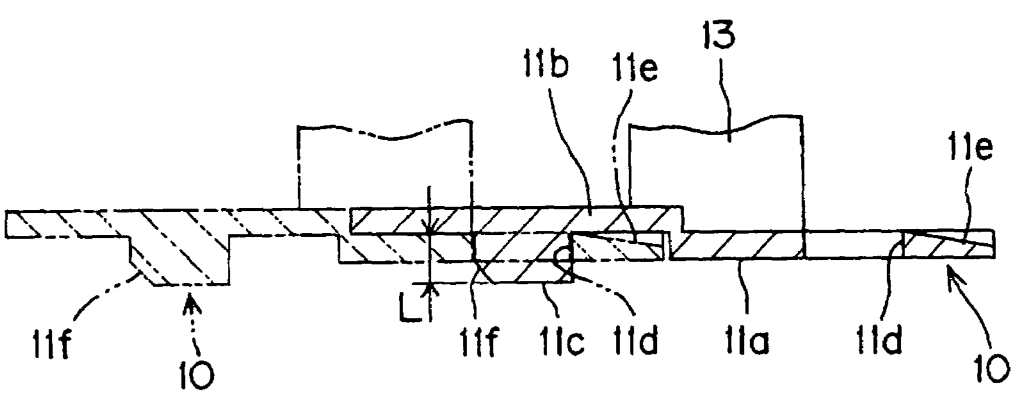
FIG. 3 is a cross-sectional view showing a fit state between a connecting pin and a connecting pin hole.

An example of a cable protection and guide device of the present invention will be described with reference to drawings. Here, FIG. 1 is a perspective view of a cable protection and guide device, which is one example of the present invention, FIG. 2 is a plan view of a link frame body shown in FIG. 1, and FIG. 3 is a cross-sectional view showing a fit state between a connecting pin and a connecting pin hole.

EXAMPLE

The cable protection and guide device of the present example is used for protecting and guiding a cable or the like such as an electric cable for transmission of electric signals or supplying electric power to connect a movable portion and a stationary portion of a production device of a plasma display and a semiconductor device or a vehicle or the like, or a hose for supplying oil pressure or pneumatic pressure. And in the cable protection and guide device of the present example, rectangular link frame bodies 10 shown in FIG. 1 are connected in large numbers in an elongated shape for connecting the above-mentioned movable portion and stationary portion, so that it can exhibit a linear state or a bending state in accordance with movement conditions between the movable portion and the stationary portion. As a result a cable C is inserted into a cable accommodating space R formed of these large number of link frame bodies 10 so that it can be protected and guided.

The link frame body 10 is molded of a fluorine resin consisting of a polyvinylidene fluoride resin (PVDF), which can exhibit excellent injection molding workability, and is integrally formed in a rectangular shape by injection molding of a pair of spaced link plates 11, 11 and connecting plates 12, 13 respectively bridged over the bending inner circumferential side and the bending outer circumferential side of the link plates 11, 11.

And the link plate is so-called an offset structure with a step formed in a direction of the plate width as shown in FIGS. 2 and 3, and has a front side connecting portion 11*a* and a rear side connecting portion 11*b*. These front side connecting portion 11*a* and rear side connecting portion 11*b* are equal in their plate thickness, but a step shifted by the plate thickness is formed between the front side connecting portion 11*a* and rear side connecting portion 11*b*.

Further, the rear side connecting portion 11*b* is provided with a connecting pin 11*c*, and the front side connecting portion 11*a* is provided with a connecting pin hole 11*d*. The connecting pin hole 11*d* has an inner diameter for fitting the connecting pin 11*c* loosely. It is noted that the reference numeral 11*e* in FIG. 1 denotes a tapered incorporating guide groove provided in the front side connecting portion 11*a* for guiding the connecting pin hole 11*d* to the connecting pin 11*c*.

Thus, a concrete form of the connecting pin 11*e* of the present example will be described in detail below.

The connecting pin 11*c* provided in the rear side connecting portion 11*b* of the link plate 11 has pin length L enough to maintain the fit with the connecting pin hole 11*d* between the connected link frame bodies 10, 10 even if the connected link frame bodies 10, 10 are twisted each other, that is a degree of pin length L by which the connecting pin 11*c* is penetrated through the connecting pin hole 11*d* and the head of the pin 11*c* is projected on an outer surface of the link plate 11. The connecting pin of the present example is slightly longer than the connecting pin of the link frame body in a conventional cable protection and guide device.

Therefore, even if a slightly deformation occurs between the connecting pin 11*c* of the link frame body 10 and the connecting pin hole 11*d* of the link frame body 10 connected to the former link body 10, the fit state therebetween is sufficiently maintained and is not disconnected.

Further, the connecting pin 11*c* includes a tapered incorporating guide surface 11*f* formed at a degree where the head of the connecting pin 11*c* is projected on an outer surface of the link plate 11 fitted to this connecting pin 11*c*. Thus, in a connection incorporating operation for connecting the link bodies to each other, when the connecting pin hole 11*d* of the link frame body 10 is incorporated to the connecting pin 11*c* of another link frame body 10 along an incorporating guide surface 11*f* through an incorporating guide groove 11*e*, the fit between the connecting pin 11*c* and the connecting pin hole 11*d* can be attained by smooth guide while utilizing a slide action due to a low friction coefficient, which is peculiar to a fluorine resin consisting of a polyvinylidene fluoride resin (PVDF). Thus, the connection incorporating of the link frame bodies 10 can be simply, reliably performed and a tool or a jig for pushing is not needed.

It is noted that to an end of a large number of link frame bodies 10 connected to required length is attached a movement end jig connected to the movable portion and to the other end thereof is attached a fixed end jig connected to the stationary portion.

As described above, the cable protection and guide device of the present example is incorporated into production devices such as a plasma display, a semiconductor device and the like. Then when the movable portion of the production device is moved, the link frame bodies 10 reaches a linear state or a bending state in accordance with the movement stroke so that the cable C is guided while being protected.

In this case since the link frame body integrally injection-molded of a polyvinylidene fluoride resin does not contain reinforced fillers, the generation of outgassing is very small. Further, the link frame bodies 10 are bent while wearing each other and the cable C wears the link plates 11 and connecting plates 12, 13, since the friction coefficient between these members are very small and wear powders are significantly suppressed, smooth and reliable movement of the movable portion can be attained without contaminating an operation environment of a clean room or the like in which the cable protection and guide device is arranged.

And during incorporating the cable protection and guide device of the present example into various machines or when a movable portion of a machine into which the cable protection and guide device of the present example is incorporated is moved, even if the cable protection and guide device of the present example is twisted, the connecting pin 11*c* can maintain the fit with the connecting pin hole 11*d*. Thus the mutual connection of link frame bodies 10 is not disconnected and reliability of the cable protection and guide device of the present example is very high.

Further, in the injection molding of the link frame bodies 10 since the polyvinylidene fluoride resin has excellent mold release characteristics and moldability, the wear of a mold is reduced and the life of the mold can be increased. Additionally, in connection and incorporation of the link frame bodies 10, since the slide properties of the link frame body 10 is good, the connecting pin 11*c* can be easily inserted into the connecting pin hole 11*d* without a particular tool and the effects of the cable protection and guide device of the present invention are very large.

DESCRIPTION OF REFERENCE NUMERALS

10 . . . Link frame body
11 . . . Link plate
11*a* . . . Front side connecting portion
11*b* . . . Rear side connecting portion
11*c* . . . Connecting pin
11*d* . . . Connecting pin hole
11*e* . . . Incorporating guide groove
11*f* . . . Incorporating guide surface
12 . . . Connecting plate
13 . . . Connecting plate
C . . . Cable
R . . . Cable accommodating space While the invention has been described by way of Example herein, those skilled in the art will recognize that changes may be made to the invention without departing from the spirit and scope of the invention as claimed below.

We claim:

1. A cable protection and guide device in which: a large number of rectangular link frame bodies are articulately connected to each other; each of said link frame bodies is adjacent and connected to another link frame body; each link frame body comprises a pair of spaced link plates and connecting plates; said connecting plates are bridged over an inner circumferential side and an outer circumferential side of said pair of link plates, respectively; each of said link plates includes connecting pins and pin holes; each of said link plates are articulately connected to each other by said connecting pins and said connecting pin holes formed in said link plates; said link bodies form an accommodating space for said cable; and said link frame bodies guide and protect said cable which resides substantially within said accommodating space; characterized in that each of said link frame bodies is made of a polyvinylidene fluoride resin; each of said connecting pins extend through respective said connecting pin holes of said link plates of said adjacent link bodies; and when said link plates of said adjacent link frame bodies are twisted with respect to each other said link frame bodies remain connected together.

2. The cable protection and guide device according to claim 1, characterized in that each of said link plates of each of said link frame bodies includes an outside surface, said connecting pin includes a head, said connecting pin has a tapered guide surface for enabling said head of said connecting pin to be inserted into and through said connecting pin hole of said link plate of said adjacent link frame body, and said connecting pin extending through said connecting pin hole to said outside surface of said link plate of said adjacent link frame body.

* * * * *

UNITED STATES PATENT AND TRADEMARK OFFICE

CERTIFICATE OF CORRECTION

PATENT NO. : 7,017,328 B2
APPLICATION NO. : 10/940108
DATED : March 28, 2006
INVENTOR(S) : Komiya et al.

It is certified that error appears in the above-identified patent and that said Letters Patent is hereby corrected as shown below:

Col. 1 line 9, after “securely” insert -- and--

Col. 1 line 27, after “pieces” delete “ (see for example Patent Reference 1)”

Col. 1 line 37, after “members.” delete “On” and insert --One--

Col. 1 line 44, after “jig.” delete “ Patent Reference1: Specification of Japanese Patent No. 3,115,995 (on page 1, FIG. 3).”

Col. 2 line 1, delete “receive” and insert --are--

Col. 2 line 1, delete “twist” and insert --twisted--

Col. 2 line 1, delete “there was a problem in handling that connected mutual link members” and insert --they--

Col. 2 line 2, delete “easy to be” and insert --easily--

Col. 2 line 8, after “twisted” insert --with respect to--

Col. 2 line 16, after “invention” delete “of claim 1”

Col. 2 line 27, after “twisted” insert --with respect to--

Col. 2 line 27, after “pin” delete “has pin length” and insert --is long--

Col. 2 line 30, after “device” delete “of claim 2”

Col. 2 line 31, after “by” delete “, in addition to the configuration of claim 1, that said” and insert -- including--

Col. 2 line 31, after “pin” insert -- that --

Col. 2 line 33, after “tapered” delete “incorporating ”

Col. 2 line 50, after “device” delete “ which is the invention of claim 1, ”

Col. 3 line 1, after “twisted” insert -- with respect to--

Col. 3 line 2 after “pin” delete “has pin length” and insert --is long--

UNITED STATES PATENT AND TRADEMARK OFFICE

CERTIFICATE OF CORRECTION

PATENT NO. : 7,017,328 B2
APPLICATION NO. : 10/940108
DATED : March 28, 2006
INVENTOR(S) : Komiya et al.

It is certified that error appears in the above-identified patent and that said Letters Patent is hereby corrected as shown below:

Col. 3 line 6, after “bodies” delete “receives” and insert -- receive--

Col. 3 line 7, after “some” delete “form deformations” and insert -- deformation--

Col. 3 line 7, after “whereby” insert -- an --

Col. 3 line 9, after “device,” insert -- which is the invention of claim 2--

Col. 3 line 10, after “pin” delete “has a” and insert -- is --

Col. 3 line 10, after “tapered” delete “incorporating” and insert -- and includes a --

Col. 3 line 14, after “invention” delete “of claim 1”

Col. 3 line 14, after “in” delete “a connection incorporating operation for”

Col. 3 line 18, after “tapered” delete “incorporating”

Col. 3 line 19, after “body” delete “while”

Col. 3 line 21, after “connection” delete “incorporating of the link frame bodies”

Col. 3 line 22, after “simply” delete “,” and insert -- and --

Col. 4 line 9, after “11b.” delete “These” and insert --The--

Col. 4 line 19, after “tapered” delete “incorporating”

Col. 4 line 26, after “L” insert -- long --

Col. 4 line 29, after “twisted” insert -- with respect to --

Col. 4 line 42, after “tapered” delete “incorporating”

Col. 4 line 45, after “connection” delete “incorporating”

Col. 4 line 48 after “is” delete “incorporated” and insert --connected--.

Col. 4 line 49, after “along” delete “ an incorporating” and insert -- a --

Col. 4 line 49, after “through” delete “ an incorporating” and insert -- a --

UNITED STATES PATENT AND TRADEMARK OFFICE

CERTIFICATE OF CORRECTION

PATENT NO. : 7,017,328 B2
APPLICATION NO. : 10/940108
DATED : March 28, 2006
INVENTOR(S) : Komiya et al.

It is certified that error appears in the above-identified patent and that said Letters Patent is hereby corrected as shown below:

Col. 4 line 54, after "connection" delete " incorporating"

Col. 5 line 4, after "body" insert --is--

Col. 5 line 5, after "resin" insert --which--

Signed and Sealed this

Fifth Day of June, 2007

JON W. DUDAS

*Director of the United States Patent and Trademark Office*